UNITED STATES PATENT OFFICE.

GEORGE W. BROWN, OF PORTLAND, OREGON.

IMPROVEMENT IN MEDICAL COMPOUNDS OR BITTERS.

Specification forming part of Letters Patent No. 130,409, dated August 13, 1872.

SPECIFICATION.

I, Dr. GEORGE W. BROWN, of Portland, Multnomah county and State of Oregon, have invented a certain preparation of a compound called "The Oregon Chittum Bitters," to be used as a tonic and purgative. It also contains diuretic and alterative properties.

To prepare the bitters I take a proportion of four of bark of the chittum tree to one of diluted alcohol or other equally strong spirituous liquors; macerate for fourteen days, and then filter.

This bitters acts on the liver and blood, carrying off the bilious matter from the liver, stomach, and bowels.

The bark used in this compound is from the chittum tree of Oregon, which I believe grows in other States of the Union.

I claim as my invention—

The manufacture or preparation of a compound, which I denominate "The Oregon Chittum Bitters," of the ingredients, in the proportions, and for the purposes set forth.

DR. G. W. BROWN.

Witnesses:
C. W. CARTER,
E. W. RYAN.